(12) United States Patent
Trattler

(10) Patent No.: US 7,999,483 B2
(45) Date of Patent: Aug. 16, 2011

(54) CIRCUIT ARRANGEMENT AND METHOD FOR ACTUATING AN ELECTRICAL LOAD

(75) Inventor: Peter Trattler, Graz (AT)

(73) Assignee: Austriamicrosystems AG, Unterpremstätten (AT)

( * ) Notice: Subject to any disclaimer, the term of this patent is extended or adjusted under 35 U.S.C. 154(b) by 386 days.

(21) Appl. No.: 12/278,911

(22) PCT Filed: Feb. 8, 2007

(86) PCT No.: PCT/EP2007/001077
§ 371 (c)(1),
(2), (4) Date: Jan. 26, 2009

(87) PCT Pub. No.: WO2007/090644
PCT Pub. Date: Aug. 16, 2007

(65) Prior Publication Data
US 2009/0315407 A1     Dec. 24, 2009

(30) Foreign Application Priority Data
Feb. 8, 2006   (DE) .......................... 10 2006 005 831

(51) Int. Cl.
*H05B 41/16*   (2006.01)
*G03B 15/03*   (2006.01)
*H02J 1/00*    (2006.01)

(52) U.S. Cl. ............... 315/241 P; 315/396; 396/164; 396/206; 307/116; 307/22; 307/29

(58) Field of Classification Search ............ 315/241 P, 315/169.2, 169.3, 363, 120, 129, 178, 240, 315/294; 363/60; 307/22, 26, 116, 29; 345/82, 345/81, 84; 394/164, 61, 182, 206
See application file for complete search history.

(56) References Cited

U.S. PATENT DOCUMENTS

| | | | | |
|---|---|---|---|---|
| 4,908,552 A | * | 3/1990 | Kumakura | 315/241 P |
| 5,272,500 A | * | 12/1993 | Taniguchi et al. | 396/155 |
| 5,283,474 A | * | 2/1994 | Oi et al. | 307/116 |
| 5,815,018 A | * | 9/1998 | Soborski | 327/172 |
| 5,914,484 A | | 6/1999 | Tawarayama et al. | |

(Continued)

FOREIGN PATENT DOCUMENTS

DE     10 2004 035 500     7/2005

OTHER PUBLICATIONS

"AAT3113/13A, AAT3114/14A High Efficiency 1.5X Fractional Charge Pumps for White LED Applications", Analogic Tech, Advanced Analogic Technologies, Inc., Sunnyvale, CA, pp. 1-14.

*Primary Examiner* — Vibol Tan
(74) *Attorney, Agent, or Firm* — Cozen O'Connor

(57) ABSTRACT

A circuit arrangement (1) for driving an electrical load (13) comprises a first and a second terminal (2, 3) for feeding a first and a second control signal (S1, S2), a first output (23), to which an electrical load (13) can be coupled, a current source (9), which is coupled to the first output (23), and a control device (5). The control device is coupled to the first and the second terminal (2, 3) and comprises a programming circuit (6) and a trigger circuit (7), which are each coupled on the output side to a control input of the current source (9).

19 Claims, 6 Drawing Sheets

U.S. PATENT DOCUMENTS

| | | | |
|---|---|---|---|
| 6,137,959 A | 10/2000 | Matsui | |
| 6,571,061 B2 * | 5/2003 | Kawasaki et al. | 396/156 |
| 6,735,386 B2 * | 5/2004 | Kitani | 396/206 |
| 7,005,978 B2 * | 2/2006 | Takeuchi et al. | 340/475 |
| 7,606,480 B2 * | 10/2009 | Chen | 396/164 |
| 2003/0013484 A1 * | 1/2003 | Nishimura et al. | 455/556 |
| 2005/0057554 A1 | 3/2005 | Yamamoto et al. | |
| 2005/0063195 A1 | 3/2005 | Kawakami | |
| 2005/0068457 A1 | 3/2005 | Yamamoto et al. | |
| 2006/0022918 A1 * | 2/2006 | Tang et al. | 345/84 |
| 2009/0016084 A1 * | 1/2009 | Trattler | 363/60 |

* cited by examiner

CIRCUIT ARRANGEMENT AND METHOD FOR ACTUATING AN ELECTRICAL LOAD

RELATED APPLICATIONS

This is a U.S. national stage under 35 USC 371 of application No. PCT/EP2007/001077 filed on Feb. 8, 2007.

This application claims the priority of German application no. 10 2006 005 831.3 filed Feb. 8, 2006, the content of which is hereby incorporated by reference.

FIELD OF THE INVENTION

The present invention relates to a circuit arrangement for driving an electrical load, an arrangement comprising the circuit arrangement, a computational unit, and an image capture device, and a method for driving an electrical load.

BACKGROUND OF THE INVENTION

Circuit arrangements for driving electrical loads are used, for example, in devices for mobile communications and in cameras. They are used, for example, for driving a light-emitting diode for generating a flash. Information on the magnitude of a current to be applied to the electrical load is frequently provided by another component of such a circuit arrangement.

SUMMARY OF THE INVENTION

One object of the present invention is to provide a circuit arrangement for driving an electrical load, an arrangement with the circuit arrangement, and a method for driving an electrical load, which can allow high flexibility in the driving of the electrical load and which can be realized economically.

According to one aspect of the invention, a circuit arrangement for driving an electrical load comprises a first and a second terminal, a first output, a current source, and a control device. An electrical load can be coupled to the first output. The current source can be coupled to the electrical load via the first output. The control device has a programming circuit and a trigger circuit. The control device is connected to the first and the second terminal. The programming circuit is connected on the output side to a first control input of the current source. The trigger circuit is connected on the output side to a second control input of the current source.

The first terminal of the circuit arrangement is used for feeding a first control signal to the circuit arrangement. The second terminal is used accordingly for feeding a second control signal. The first and the second control signal are fed to the control device. The control device is designed for processing the first and the second control signal. The programming circuit and the trigger circuit provide signals on the output side, which are fed to the control inputs of the current source and which are used for setting and triggering a current-source current of the current source. The current source provides energy in the form of the current-source current to the load.

Advantageously, a parameter for programming the current source and the time point for triggering or activating the current source are received by the circuit arrangement as a function of the two supplied control signals.

In one embodiment, the circuit arrangement can comprise a logic circuit, which is connected on the input side to the programming circuit and the trigger circuit and on the output side to a common control input of the current source. The signal provided on the output side to the programming circuit and the signal provided on the output side to the trigger circuit can therefore be linked by means of the logic circuit into a combined control signal, which is fed to the common control input of the current source. The logic circuit can have an AND gate.

In an alternative embodiment, the programming circuit is used for the output of a programming signal to the first control input of the current source. The programming signal can be used for setting a current value of a current-source current. The programming circuit can be coupled on the input side to the first and the second terminal of the circuit arrangement.

In one improvement, the programming circuit has a counter, which is coupled on the input side to the first terminal of the circuit arrangement and on the output side to the first control input of the current source and which is provided for counting a first number n of pulses in the first control signal. The programming signal is set as a function of the first number n of pulses.

In an alternative embodiment, the trigger circuit is used for feeding a trigger signal to the second control input of the current source. The trigger circuit can be coupled on the input side to the first and the second terminal of the circuit arrangement. By means of the trigger signal, the current source is actively switched at a trigger time point, so that the current-source current is discharged to the load. The trigger circuit can comprise a flip-flop and an AND gate, which are suitably connected for providing the trigger signal.

The current source can be configured as a charge pump and can provide, on the output side, an output voltage and a current-source current. Preferably, the current source is configured as a current sink. In one embodiment, the control device can be configured as a computational unit. The circuit arrangement can be realized on a semiconductor body.

In one embodiment according to the invention, an arrangement can have the circuit arrangement, the electrical load, and a computational unit, which is coupled at a first terminal to the first terminal of the circuit arrangement.

In one embodiment, the computational unit can be coupled at a second terminal to the second terminal of the circuit arrangement. Alternatively, the second terminal of the circuit arrangement can be coupled via an impedance network to the first terminal of the computational unit.

In one embodiment, the arrangement also comprises an image capture device, which is connected to the computational unit. The image capture device can comprise a control circuit and a photodetector arrangement, which can be configured as a charge-coupled device. Advantageously, the photodetector arrangement is configured as a CMOS camera arrangement. In an improvement, the image capture device can be coupled on the output side via a first impedance configured as a resistor to the second terminal of the circuit arrangement. This coupling can be used advantageously for triggering a flash.

The circuit arrangement can comprise the functionality of a slave module for an Inter-IC bus, abbreviated I2C bus. The first terminal can be used as a serial-data terminal and the second terminal as a serial-clock terminal. The computational unit can comprise the functionality of a master module and the image capture device can comprise the functionality of another slave module.

The arrangement can be used for controlling an electrical load, in particular, a light-emitting diode, in a camera. The computational unit can be configured as a baseband circuit. The arrangement can be used for driving the electrical load in a device for mobile communications.

According to an aspect of the invention, a method for driving an electrical load provides the following steps: a control device evaluates a first and a second control signal and recognizes during a first phase a start condition by comparing the first control signal with a predetermined value and/or the second control signal with another predetermined value. The control device provides a programming signal as a function of the first control signal during a second phase, which follows the first phase, and outputs the programming signal to a current source. The control device outputs a trigger signal to the current source during a third phase, which follows the second phase. The trigger signal is used for activating the output of a current-source current for powering the load.

Advantageously, by means of the programming signal, the magnitude of the current-source current and by means of the trigger signal the time point for the output of the current-source current to the electrical load is set.

In one improvement, the circuit arrangement has a first and a second operating mode and the control device is designed to recognize the operating mode during the first phase. In one embodiment, the control device sets the circuit arrangement into a first operating mode when, during the first phase, the rising edge of the first control signal appears before the rising edge of the second control signal. Accordingly, the control device can set the circuit arrangement into a second operating mode when the rising edge of the first control signal appears after the rising edge of the second control signal.

In one embodiment, in the first operating mode, the trigger signal can be provided directly or with an adjustable delay time after the rising edge of the last pulse of the first control signal during the second phase. In an alternative embodiment, in the first operating mode, the trigger signal can be provided directly or with an adjustable delay time after the rising edge of the second control signal, which appears during the first phase.

In the second operating mode, the trigger signal can be output as a function of the appearance of a predetermined value in the second control signal during the third phase. Here, in the second operating mode, the trigger signal can be output directly or with an adjustable delay time after a rising edge of the second control signal during the third phase. For permanent setting of the second operating mode, the first terminal of the computational unit can be connected directly to the first terminal of the circuit arrangement, as well as via an impedance network to the second terminal of the circuit arrangement.

In one improvement, during the second phase a first number n of pulses of the first control signal is counted and the programming signal is provided as a function of the first number n of pulses.

In one embodiment, the current source is configured in such a way that it is actively switched with the appearance of an edge of the trigger signal. Preferably, the current source outputs the current-source current to the electrical load only after an adjustable delay time has elapsed.

The first control signal can be configured as a serial data signal for the I2C bus, abbreviated SDA, and the second control signal can be configured as a serial clock signal, abbreviated SCL. The control device recognizes the start condition with reference to a falling edge of the first control signal, while the second control signal assumes the value HIGH. After the first phase, the computational unit provides the first control signal with address information. In case the address information matches an address of the circuit arrangement, the control device evaluates the data received during the following second phase. Advantageously, the data comprises a programming value, which is used for setting the programming signal in the programming circuit. The control device recognizes the end of the second phase with reference to a rising edge of the first control signal, while the second control signal has a value HIGH.

During the third phase, in one embodiment the first control signal can have the value HIGH. During the third phase, if, for example, a positive edge appears in the second control signal, then the trigger signal is provided as a function of this edge. The trigger signal can be output directly after such a transition. Alternatively, the trigger signal can be provided delayed by an adjustable delay time relative to the transition in the second control signal. Alternatively, a falling edge of the second control signal can be used during the third phase for forming the trigger signal. Additional phases can be provided between the first and the second phase and between the second and the third phase. A rising edge is designated with a positive or ascending edge. Accordingly, a falling edge is designated with a negative or descending edge.

BRIEF DESCRIPTION OF THE DRAWINGS

The invention will be explained in more detail below using several embodiments with reference to the figures. Components or signals with identical function or effect carry identical reference symbols. In so far as circuit parts, components, or signals correspond in their function, their description will not be repeated for each of the following figures.

DETAILED DESCRIPTION OF THE DRAWINGS

Figure 1A:
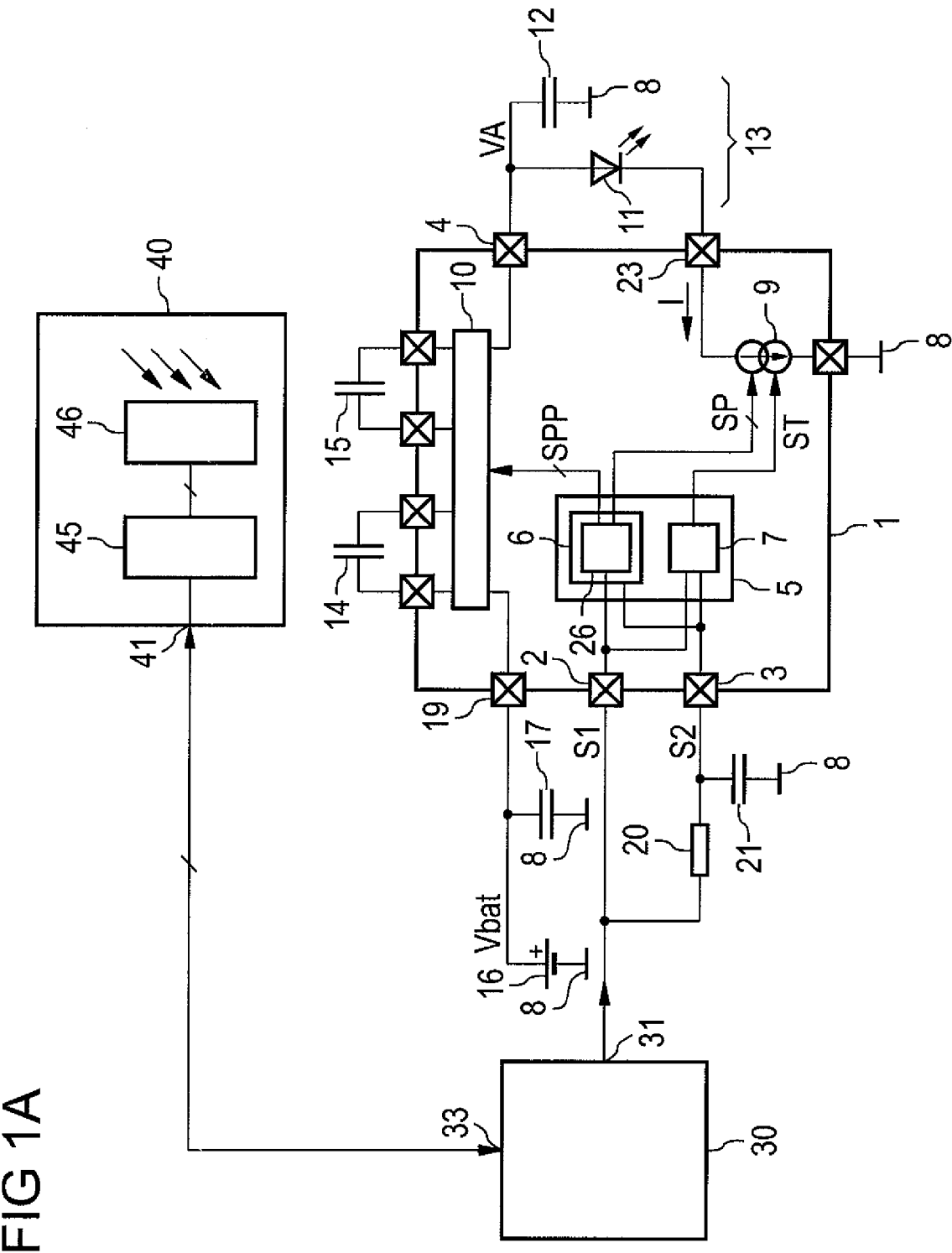
FIGS. 1A-1C show example embodiments of an arrangement according to the invention.

FIG. 1A shows an example embodiment of an arrangement with a circuit arrangement 1, an electrical load 13, a computational unit 30, and an image capture device 40. The circuit arrangement 1 comprises a control device 5 with a programming circuit 6 and a trigger circuit 7, a current source 9, a charge pump 10, a first and a second terminal 2, 3, a power supply voltage terminal 19, and also a first and a second output 23, 4. The control device 5 and thus the programming circuit 6 and the trigger circuit 7 are connected to the first and the second terminal 2, 3. The programming circuit 6 has a counter 26. The programming circuit 6 and also the trigger circuit 7 are connected on the output side to a first and a second control terminal of the current source 9. The current source 9 is attached to the first output 23. It couples the first output 23 to a reference potential terminal 8. The second output 4 is coupled to the power supply voltage terminal 19. The charge pump 10 is connected between the power supply voltage terminal 19 and the second output 4 and is connected via two additional terminals of the circuit arrangement 1 to a first capacitor 14.

Charge pump 10 can be model no. AS 3685 available from austriamicrosystems AG. The electrical load 13 comprises a light-emitting diode 11, which is connected between the second output 4 and the first output 23 of the circuit arrangement 1. The arrangement comprises a battery 16, which is connected between the power supply voltage terminal 19 and the reference potential terminal 8. The computational unit 30 comprises a first terminal 31, which is connected to the first terminal 2 of the circuit arrangement 1. Furthermore, the first terminal 31 of the computational unit 30 is coupled via an impedance network 20, 21 to the second terminal 3 of the circuit arrangement 1. The impedance network 20, 21 is configured as a low-pass filter and comprises a resistor 20 and a capacitor 21. The resistor 20 couples the first terminal 31 of the computational unit 30 to the second terminal 3 of the circuit arrangement 1. The second terminal 3 of the circuit arrangement 1 is coupled via the capacitor 21 to the reference potential terminal 8. The computational unit 30 is connected at a coupling terminal 33 to a first terminal 41 of the image capture device 40. The image capture device 40 comprises a control circuit 45, which is connected to a photodetector arrangement 46 and to the first terminal 41 of the image capture device 40.

Computational unit 30 can be the Qualcomm QSC 6270 processor. Image capture device 40 can be the Panasonic GP-KM3500V camera module. The battery 16 is used for the output of a battery voltage Vbat to the power supply voltage terminal 19 of the circuit arrangement 1. The battery voltage Vbat is fed to the charge pump 10. The charge pump 10 provides, by means of the first capacitor 14, an output voltage VA on the second output 4 of the circuit arrangement 1. The computational unit 30 outputs on the first terminal 31 a first control signal S1, which is fed to the first terminal 2 of the circuit arrangement 1. From the first control signal S1, a second control signal S2, which is fed to the second terminal 3 of the circuit arrangement 1, is generated by means of the impedance network 20, 21. As a function of the first and the second control signal S1, S2, the control device 5 provides a programming signal SP and a trigger signal ST, which are fed to a first and a second control terminal of the current source 9. By means of the counter 26, a first number n of pulses in the first control signal S1 is counted. The programming signal SP is output by the programming circuit 6 as a function of the first number n, whereas the trigger signal ST is provided by the trigger circuit 7. A value of a current-source current I of the current source 9 is set as a function of the programming signal SP. By means of the trigger signal ST an activation time point or trigger time point t3 of the current source 9 can be set. In the case of activation of the current source 9, the current-source current I flows from the charge pump 10 through the electrical load 13 and through the current source 9 to the reference potential terminal 8. The photodetector arrangement 46 provides, as a function of appearing light signals, electrical signals that are fed via the control circuit 45 to the computational unit 30 as image information.

Advantageously, the current-source current I and thus the light intensity or the lighting period of the light-emitting diode 11 can be set by means of the programming circuit 6 in the control circuit 5. Advantageously, a trigger signal ST, with which a trigger time point t3 of the current source 9 can be set, can be provided by means of the trigger circuit 7 in the control circuit 5, so that a light flash can be output by the light-emitting diode 11.

In an alternative embodiment, the charge pump 10 can be connected via two additional terminals of the circuit arrangement 1 to a second capacitor 15. The charge pump 10 provides the output voltage VA to the second output 4 of the circuit arrangement 1 by means of the first capacitor 14 and also by means of the second capacitor 15.

Alternatively, the electrical load 13 can comprise a first smoothing capacitor 12, which connects the second output 4 to the reference potential terminal 8.

In an alternative embodiment, the arrangement has a second smoothing capacitor 17, which is connected in parallel to the battery 16 and which couples the power supply voltage terminal 19 to the reference potential terminal 8.

Figure 1B:
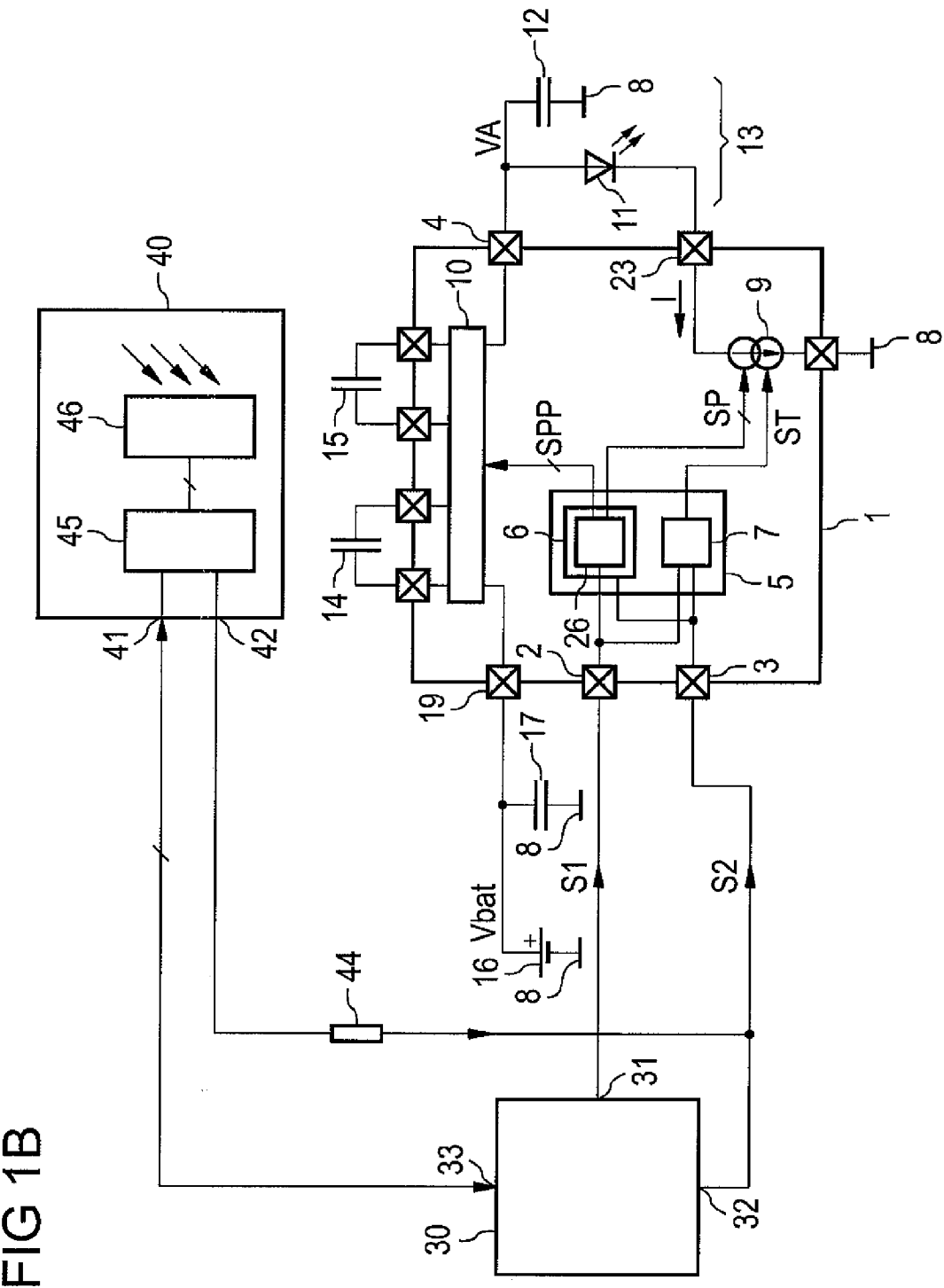

FIG. 1B shows another example embodiment of the arrangement with the circuit arrangement 1, the computational unit 30, the image capture device 40, the electrical load 13, and the battery 16. The circuit arrangement 1 according to FIG. 1B can be the same circuit arrangement 1 as according to FIG. 1A. The same semiconductor body, comprising the circuit arrangement 1, can be connected externally both according to FIG. 1A and also according to FIG. 1B.

In contrast to the arrangement according to FIG. 1A, the arrangement according to FIG. 1B shows a first impedance 44, which couples an output 42 of the image capture device 40, which is connected to the control circuit 45 of the image capture device 40, to the second terminal 3 of the circuit arrangement 1. In addition, the second terminal 3 of the circuit arrangement 1 is connected to a second terminal 32 of the computational unit 30. If the second terminal 32 of the computational unit 30 is switched into an open operating state, then a signal is fed at the output 42 of the image capture device 40 via the first impedance 44 to the second terminal 3 of the circuit arrangement 1 as the second control signal S2. Advantageously, a time point t3 for triggering the flash can thus be preset by the control circuit 45. The expression "open operating state" as used herein means that the output terminal provides neither a high nor a low (i.e., high voltage or 0 volts). Instead, the output terminal produces a high impedance and does not influence the signal on the line which is connected thereto. This describes a tristate output terminal.

In an alternative embodiment the arrangement has no first impedance 44 and thus no coupling of an output 42 of the image capture device 40 to the second terminal 3 of the circuit arrangement 1. According to this embodiment, the computational unit 30 sets the trigger time point t3 for the flash by means of the second control signal S2 and uses the connection of the second terminal 32 of the computational unit 30 to the second terminal 3 of the circuit arrangement 1.

Figure 1C:
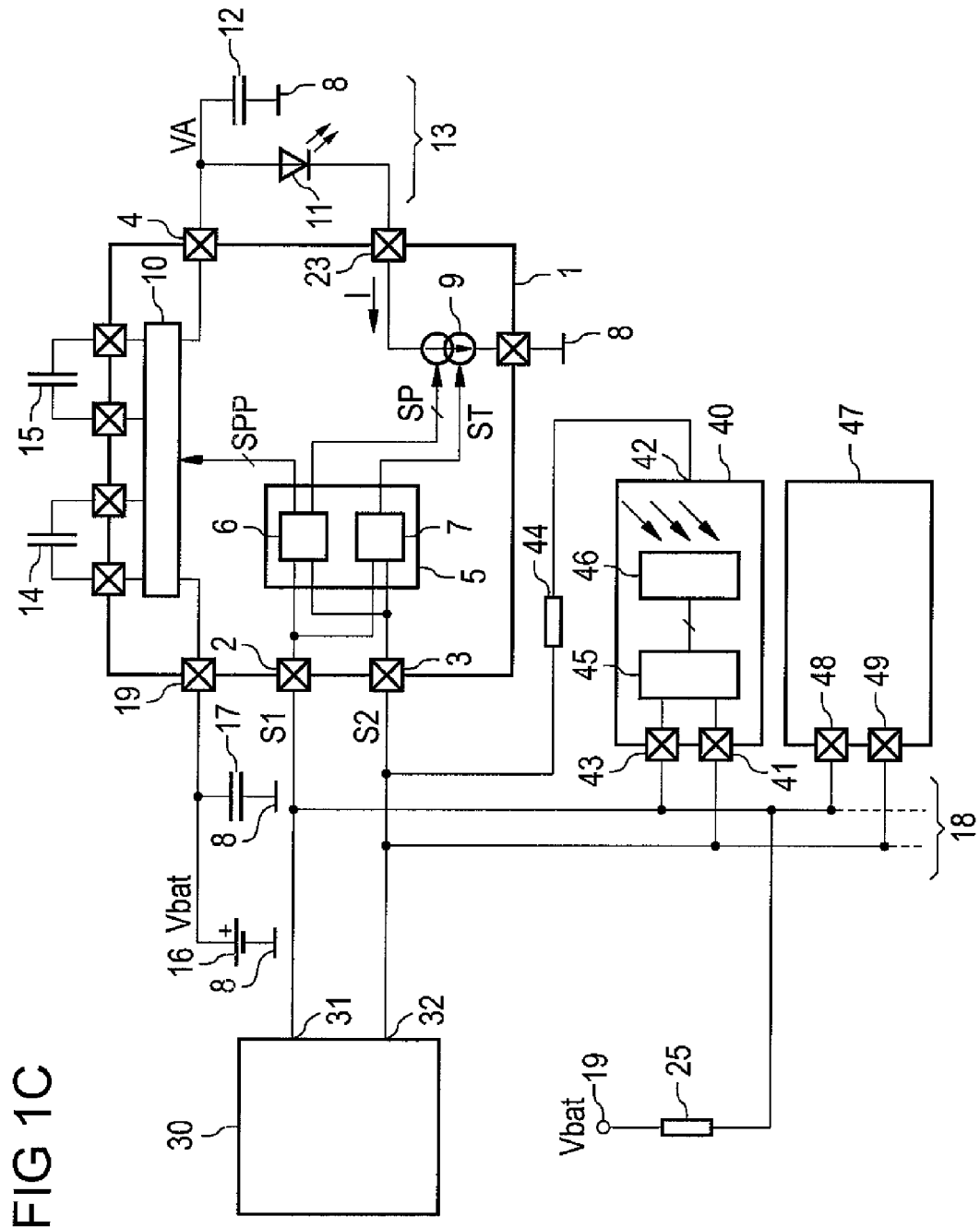

FIG. 1C shows another example embodiment of the arrangement with the control circuit 1, the electrical load 13, the computational unit 30, the image capture device 40, and also additional circuit 47. The arrangement has an I2C bus 18. The computational unit 30 is configured as a master module and the circuit arrangement 1, the image capture device 40, and the additional circuit 47 are configured as slave modules for the I2C bus 18. In contrast to the arrangements according to FIGS. 1A and 1B, first terminal 31 of the computational unit 30 is connected to the first terminal 2 of the circuit arrangement 1, a second terminal 43 of the image capture device 40, a first terminal 48 of the additional circuit 47, and via a resistor 25 to the power supply voltage terminal 19. The second terminal 32 of the computational unit 30 is connected to the second terminal 3 of the circuit arrangement 1, the first terminal 41 of the image capture device 40, and also a second terminal 49 of the additional circuit 47. In addition, the second terminal 3 of the circuit arrangement 1 is coupled to the output 42 of the image capture device 40 via the first impedance 44. The first impedance 44 is configured as a resistor.

The additional circuit 47 can be the Maxim DS 28CZ04 EEPROM available from Dallas Semiconductor. It does not have a particular function as a part of the present invention. It is a slave circuit in the depicted arrangement, and its inclusion is intended to represent that the depicted arrangement can comprise further circuits.

The resistor 25 is used for feeding the battery voltage Vbat to the line of the I2C bus 18 that couples the terminals 2, 31, 43, 48. If none of the terminals 2, 31, 43, 48 is switched to a value LOW, then the line of the I2C bus 18 that connects the four terminals 2, 31, 43, 48 is set to the value HIGH. The line that couples the four terminals 3, 32, 41, 49 is loaded in a first operating state of the arrangement with a signal that is provided by the second terminal 32 of the computational unit 30. In a second operating state of the arrangement, in which the flash is to be triggered, the second terminal 32 of the computational unit 30 is switched into a tristate condition and the line is loaded with a signal that is provided by the output 42 of the image capture device 40. According to I2C bus specifications, the first and the second control signals S1, S2 are provided by the computational unit 30 on the first and the second terminals 31, 32. A signal on the output 42 of the image capture device 40 is approximately equal to the second control signal S2 as long as the second terminal 32 of the computational unit 30 and also the first terminal 41 of the image capture device 40 and the second terminal 49 of the additional circuit 47 are set in an open operating state. Advantageously, in this way, programming values of the programming circuit 6 can be fed to the control device 5 via the I2C bus 18. Advantageously, the trigger signal ST can be provided as a function of a signal on an output 42 of the image capture device 40.

In an alternative embodiment, deviating from the circuit arrangement 1 according to FIGS. 1A, 1B, and 1C, the circuit arrangement 1 can have a current source 9 with a control input instead of the first and the second control inputs.

Figure 1D:
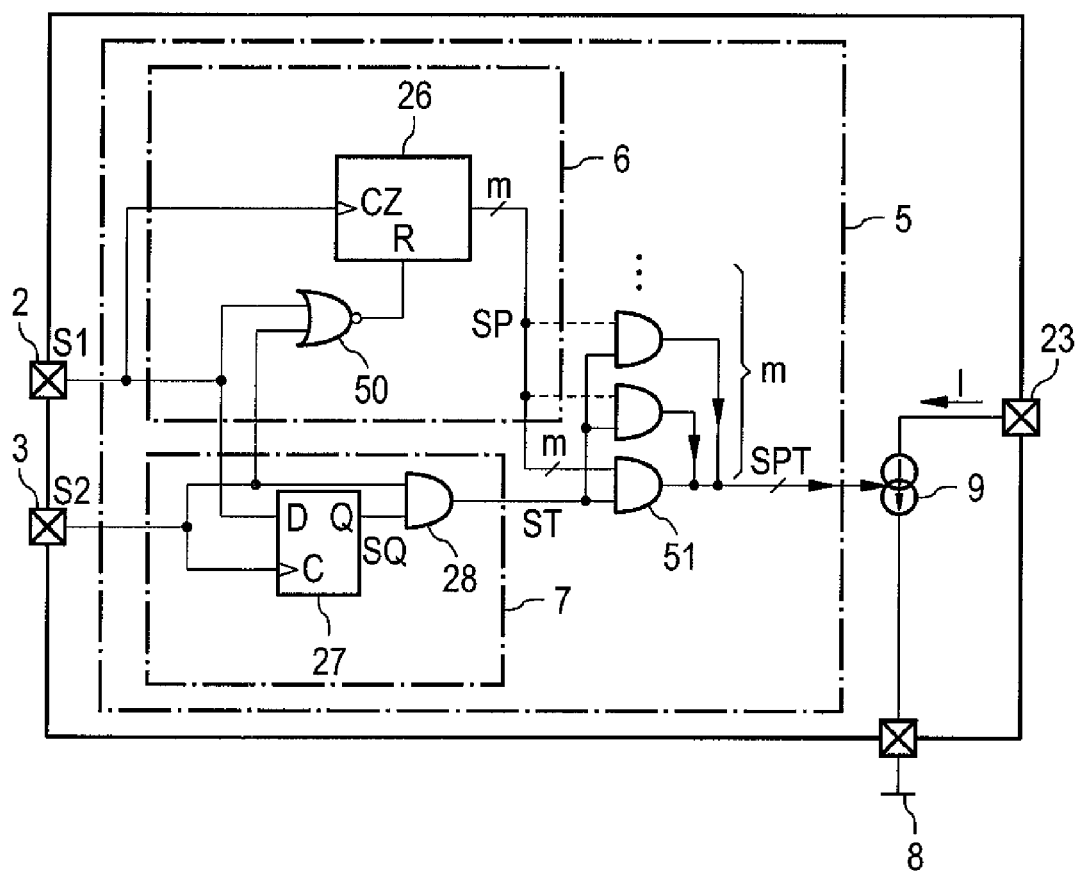
FIG. 1D shows an example embodiment of a control device coupled to a current source.

FIG. 1D shows an example embodiment of a control device 5, comprising a programming circuit 6 and a trigger circuit 7, and a coupling of the control device 5 to a current source 9, as it can be used in the circuit arrangements 1 according to FIGS. 1A-1C.

The programming circuit 6 comprises the counter 26 and a NOR gate 50. The NOR gate 50 is coupled on the input side to the first and the second terminal 2, 3 of the circuit arrangement 1. The counter 26 is connected at a counter signal input CZ to the first terminal 2 of the circuit arrangement 1 and at a reset input R to an output of the NOR gate 50. The trigger circuit 7 has an AND gate 28 and a flip-flop 27. The flip-flop 27 is coupled on the input side to the first and the second terminal 2, 3 of the circuit arrangement 1. The flip-flop 27 is configured as a rising edge-triggered flip-flop, which can also be designated as a non-transparent flip-flop. The flip-flop 27 can be realized as a master-slave flip-flop. Here, a data input D of the flip-flop 27 is connected to the first terminal 2 and a clock input C of the flip-flop 27 is connected to the second terminal 3. The AND gate 28 is connected on the input side to the second terminal 3 of the circuit arrangement 1 and to a data output Q of the flip-flop 27. Here, the flip-flop 27 is realized in such a way that, for a rising edge on its clock input C, it assumes the value applied to its data input D and provides it as a value on its data output Q with approximately no delay. The flip-flop 27 can assume a new value applied to its data input D only when there is a subsequent rising edge on the clock input C. On the output side, the counter 26 of the programming circuit 6 and the AND gate 28 of the trigger circuit 7 are coupled via a logic circuit, which has another AND gate 51, to a control input of the current source 9 for providing a combined control signal SPT.

By means of the additional AND gate 51, it is achieved that a default value for the current-source current I is forwarded to the current source 9 only for a value HIGH of the trigger signal ST. At the trigger time point t3, the current source 9 provides the current-source current I.

In an alternative configuration, the counter 26 has a second number m of outputs, which are coupled via a second number m of AND gates 51 to control inputs of the current source 9. Advantageously, the current-source current I can in this way be programmed in smaller steps.

Figure 2A:
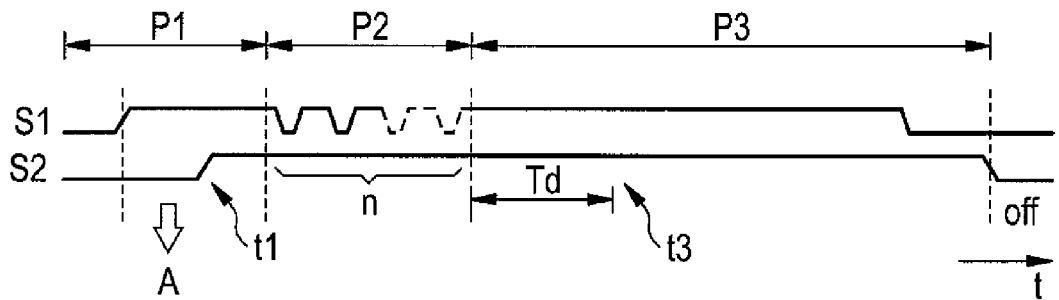
FIGS. 2A-2F show example profiles of a first and a second control signal as a function of time t.

FIG. 2A shows an example profile of the first and the second control signal S1, S2, as it can appear in the arrangement according to FIG. 1A. In a first phase P1 the first control signal S1 has a rising edge. Offset in time, the second control signal S2 likewise shows a rising edge. The time delay is dependent on the impedance network 20, 21, which is connected before the second terminal 3. According to the example in FIG. 2A, the start condition, which is fulfilled at time point t1, has a value HIGH both for the first and also for the second control signal S1, S2. In the second phase P2 following the first phase P1, the first control signal S1 shows a first number n of pulses, for example, three pulses are shown. The second control signal S2 is nearly unchanged during the second phase P2 due to the low-pass filter characteristics of the impedance network 20, 21 at the value HIGH. As soon as the first control signal S1 is consistently at a value HIGH, the end of the second phase P2 and a beginning of a third phase P3 is reached. In the third phase P3 the first and the second control signals S1, S2 have a value HIGH. In the third phase P3, after an adjustable delay time Td has elapsed, the current source 9 is switched to an active operating state by means of the control signal ST. Thus, advantageously, by means of an individual output signal on the first terminal 31 of the computational unit 30, both a value of the current-source current I and also a trigger time point t3 are set.

Figure 2B:
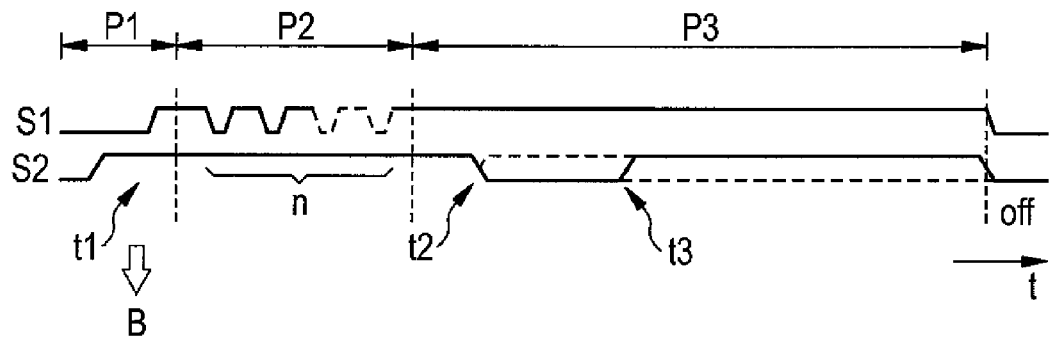

FIG. 2B shows example profiles of the first and the second control signal S1, S2, as they can appear in an arrangement according to FIG. 1B. As in FIG. 2A, in FIG. 2B the start condition is also fulfilled as soon as the first and second control signals S1, S2 have the value HIGH. This is the case at a time point t1. In the second phase P2, the first control signal S1 shows a first number n of pulses. If the first control signal S1 constantly has the value HIGH, then the end of the second phase P2 and the beginning of the third phase P3 is reached. The second control signal S2 has the value HIGH during the second phase P2 and at the beginning of the third phase P3. At a time point t2, the second terminal 32 of the computational unit 30 is switched into an open operating state. The second control signal S2 is thus generated starting at the time point t2 by means of a signal on the output 42 of the image capture device 40 as a function of the first impedance 44. In the example according to FIG. 2B, by means of the image capture device 40, the second control signal is raised at the trigger time point t3 from the value LOW to the value HIGH. The positive edge of the second control signal S2 triggers the trigger signal ST, with which the current source 9 is switched at the trigger time point t3 into an active operating state.

In one embodiment of the circuit arrangement 1 a first or a second operating mode A, B is set as a function of the first and the second control signal S1, S2 during the first phase P1. The first operating mode A is activated with the profiles of the control signals S1 and S2 according to FIG. 2A and the second operating mode B is activated with the profiles of the first and the second control signals S1, S2 according to FIG. 2B. According to FIG. 2A, the positive edge of the first control signal appears before the positive edge of the second control signal S2. In contrast, in FIG. 2B the positive edge of the first control signal S1 appears after the positive edge of the second control signal S2. Alternatively, the positive edge of the second control signal S2 can also appear before the positive edge of the first control signal S1, in order to switch the circuit arrangement 1 into the second operating mode B.

In the first operating mode A, the trigger signal ST is automatically switched by the circuit arrangement 1, so that the current source 9 is switched into an active operating state at the trigger time point t3. In contrast, in the second operating mode B, the second control signal S2 is evaluated and the trigger signal ST is provided only when a positive edge of the second control signal S2 appears during the third phase P3.

Figure 2C:
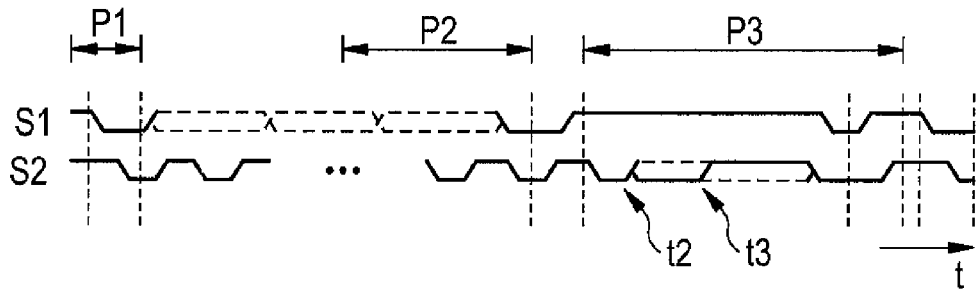
Figure 2D:
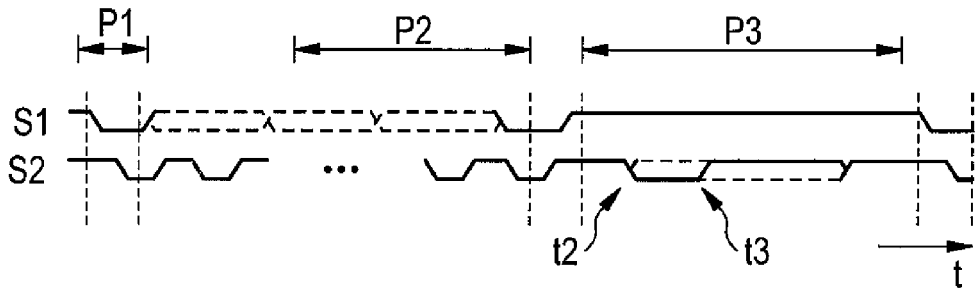

FIGS. 2C and 2D show example embodiments of profiles of the first and the second control signal S1, S2 in the case of an arrangement with an I2C bus 18. According to I2C specifications a start is triggered in such a way that the first control signal S1 has a falling edge, while the second control signal S2 has the value HIGH. The first control signal S1 is here configured as an SDA signal and the second control signal S2 is configured as an SCL signal. By means of this start condition, the first phase P1 is defined. The second control signal S2 is used as a clock signal, while the first control signal S1 transfers data. In a phase following the first phase P1, an address is output by the computational unit 30. The slave modules like the circuit arrangement 1, the image capture device 40, as well as the additional circuit 47 are designed for comparing the address with its own address. The mentioned module evaluates data following the address. If the circuit arrangement 1 is referenced, then the data sent after the address comprise a programming value, which is fed to the programming circuit 6 and which is used for providing the programming signal SP. After the end of the second phase P2, the first and second control signals S1, S2 are fixed according to I2C specifications so that a stop condition is reached.

At the time point t2 the second terminal 32 of the computational unit 30 is switched to an open operating state. Therefore, the image capture device 40 can provide the second control signal S2 starting at this time point t2 by means of a signal on the output 42 and the first impedance 44. With a positive edge in the signal on the output 42 of the image capture device 40, a positive edge of the second control signal S2 is realized, so that the trigger signal ST switches the current source 9 into an active state at the trigger time point t3.

FIG. 2D shows another example profile of the two control signals S1, S2 in an arrangement with an I2C bus 18. In contrast to the profiles according to FIG. 2C, in FIG. 2D the second control signal S2 is at a value HIGH at the beginning of the third phase, before, at the time point t2, the second terminal 32 of the computational unit 30 is switched into an open operating state. Only the circuit arrangement 1 reacts to the change of the second control signal S2 during the third phase P3, in which no regular communications take place via the I2C bus 18. Thus, advantageously, the image capture device 40 can set the trigger time point t3 of a flash of light.

Figure 2E:
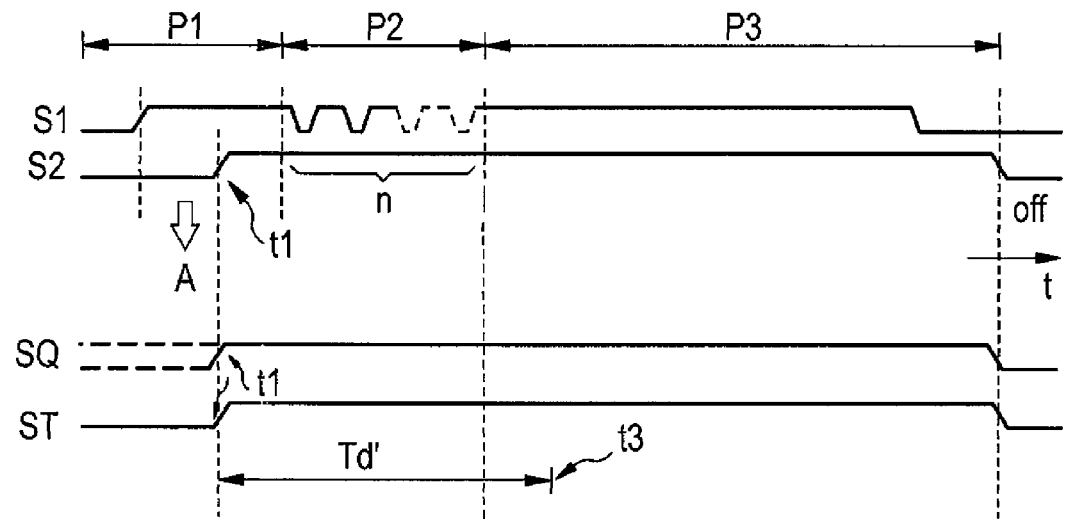

FIG. 2E shows another example profile of the signals. The signals according to FIG. 2E can appear in the arrangement according to FIG. 1A, in which the control device 5 according to FIG. 1D is used. Here, with respect to the first and the second control signal S1, S2, reference is made to the description of FIG. 2A, which is not repeated here. The first and second control signals S1, S2 are fed to the NOR gate 50. A signal at the output of the NOR gate 50 is fed to the reset input R of the counter 26. The signal on the output of the NOR gate 50 is at the value HIGH at the beginning of the first phase P1, so that, at this time point, the counter 26 is reset. After the reset, the counter 26 counts the pulses in the first control signal S1. These are fed to the counter 26 in the second phase P2.

A clock signal applied to the clock input C of the flip-flop 27 corresponds to the second control signal S2. Because the flip-flop 27 is an edge-triggered flip-flop, which assumes for a rising edge of the clock signal, the value applied to the data input D, the flip-flop 27 assumes in the first phase P1 at time point t1 the value HIGH and provides an output signal SQ on the data output Q with the value HIGH. The output signal SQ remains at the value HIGH. The second control signal S2 and the output signal SQ are fed to the two inputs of the AND gate 28. The trigger signal ST is provided on the output of the AND gate 28. The trigger signal ST is at the value HIGH starting at the time point t1 to the end of the third phase P3. With the rising edge of the trigger signal ST at the time point t1, the time interval of the delay time Td' begins, which ends at the trigger time point t3. The current source 9 outputs the current-source current I after the delay time Td' has elapsed. Advantageously, the delay time Td' is set in such a way that the trigger time point t3 is comprised by the third phase P3.

Figure 2F:
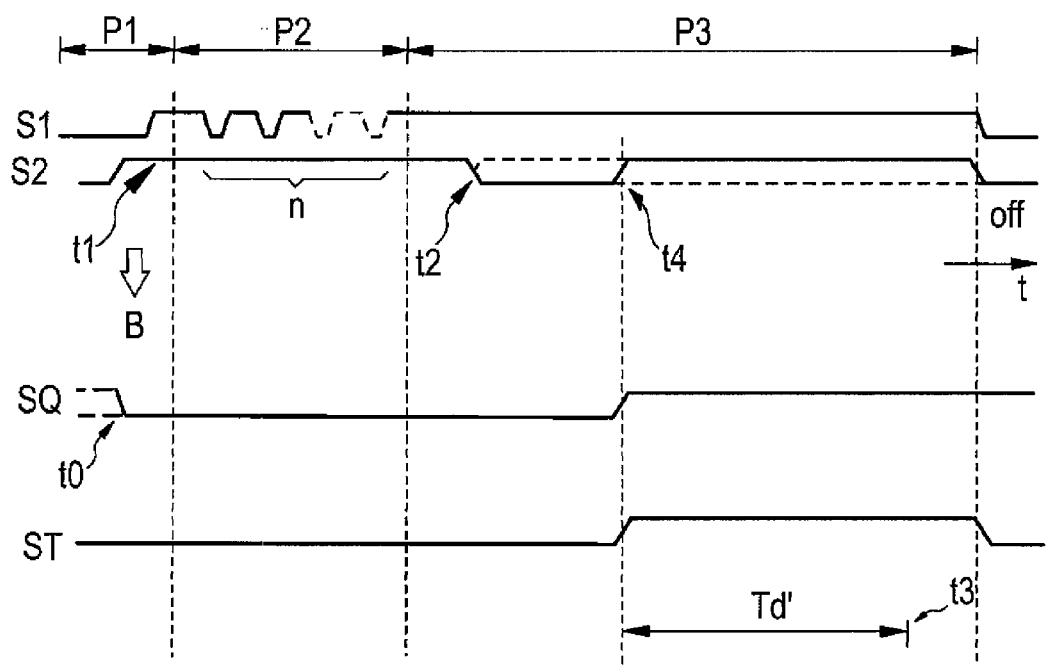

FIG. 2F shows another example profile of the signals. The signals according to FIG. 2F can appear in the arrangement according to FIG. 1B, in which the control device 5 according to FIG. 1D is used. Here, with respect to the first and the second control signal S1, S2, reference is made to the description of FIG. 2B, which is not repeated here. The signals of the counter 26 correspond to the description specified in FIG. 2E. In the first phase P1, a rising edge appears in the second control signal S2, so that the flip-flop 27 assumes the value LOW applied to the data input D and therefore provides the output signal SQ with the value LOW starting at the time point t0. For a rising edge of the second control signal S2 in the third phase P3, the flip-flop 27 assumes the value HIGH applied to the data input D and provides the output signal SQ with the value HIGH. This appears at a time point t4. Only starting at the rising edge in the second control signal S2 in the third phase P3, the trigger signal ST has the value HIGH, so that, as in FIG. 2E, the delay time Td' begins. Corresponding to FIG. 2E, in the third phase P3 after the delay time Td' has elapsed, the current source 9 outputs the current-source current I at the trigger time point t3.

Advantageously, one embodiment of the control device 5 can be operated both in an arrangement according to FIG. 1A and also in an arrangement according to FIG. 1B. If the output signal SQ has the value HIGH at the end of the first phase P1, then the arrangement is in the first operating mode A. However, if the output signal SQ is at the value LOW at the end of the first phase P1, then the arrangement is in the second operating mode B. Thus, by means of the flip-flop 27 and the output signal SQ, the two operating modes A, B can be distinguished. The output signal SQ has, in both operating modes A, B, the same value during the second phase P2 as at the end of the first phase P1.

Advantageously, in both arrangements, the rising edge of the second control signal S2 triggers the trigger signal ST, so that the current source 9 is in an active operating state, in which it provides the current-source current I, starting at the trigger time point t3. Here, the rising edge of the second control signal S2 causes a rising edge of the trigger signal ST. Triggering the current source 9 is thus realized as a function of a rising edge of the second control signal S2 and the delay time Td'. Advantageously, the current source 9 reacts to the rising edge of the trigger signal ST with a delay by the delay time Td'. In the first operating mode A, while the rising edge of the trigger signal ST is generated as a function of the first rising edge of the second control signal S2, in the second operating mode B the rising edge of the trigger signal ST is generated as a function of the second rising edge of the second control signal S2.

In one embodiment, the delay time Td' can be adjustable.

In alternative embodiments to the profiles according to FIGS. 2B to 2F, the trigger time point t3 is set as a function of a falling edge of the second control signal S2.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A circuit arrangement for driving an electrical load, comprising:
   a first terminal for feeding a first control signal;
   a second terminal for feeding a second control signal;
   a first output, to which an electrical load can be coupled;
   a current source, which is coupled to the first output; and
   a control device, which is coupled to the first and the second terminal, comprising
      a programming circuit, which is coupled on the output side to a first control input of the current source, and
      a trigger circuit, which is coupled on the input side to the first and the second terminal and on the output side to a second control input of the current source,
   wherein the programming circuit comprises a counter, which is coupled on the input side to the first terminal and on the output side to the first control input of the current source and which is adapted to count pulses of the first control signal.

2. The circuit arrangement according to claim 1, wherein the programming circuit is adapted to output a programming signal to the first control input of the current source for setting a current value of a current-source current and the trigger circuit is adapted to output a trigger signal to the second control input of the current source for triggering an output of the current-source current to the electrical load.

3. The circuit arrangement according to claim 1, wherein the trigger circuit comprises a flip-flop and an AND gate for generating the trigger signal.

4. The arrangement according to claim 1, wherein the control device is adapted for operating the trigger circuit in one of two operating modes as a function of the first and/or the second control signal.

5. The circuit arrangement according to claim 1, wherein the first control input of the current source and the second control input of the current source are configured as a common control input of the current source.

6. An arrangement comprising the circuit arrangement according to claim 1, the electrical load connected to the first output, a computational unit with a first terminal, which is connected to the first terminal of the circuit arrangement for feeding the first control signal, and an image capture device, which is coupled to the computational unit.

7. The arrangement according to claim 6, wherein the second terminal of the circuit arrangement is coupled via an impedance network to the first terminal of the computational unit.

8. The arrangement according to claim 6, wherein the second terminal of the circuit arrangement is coupled to a second terminal of the computational unit and via a first impedance to an output of the image capture device.

9. The arrangement according to claim 1 wherein the computational unit is configured as a baseband circuit.

10. A method for driving an electrical load, comprising the steps of:
   recognizing a start condition by evaluating a first and a second control signal by means of a control device;
   setting a programming signal in the control device as a function of the first control signal and providing the programming signal to a current source;
   outputting a trigger signal from the control device to the current source for triggering a current-source current, which is output to the electrical load; and
   counting a first number n of pulses of the first control signal and setting the programming signal as a function of the first number n of pulses.

11. The method according to claim 10, further comprising outputting the trigger signal to the current source as a function of the second control signal.

12. The method according to claim 10, further comprising outputting the trigger signal to the current source as a function of a falling edge of the last pulse of the first control signal and an adjustable delay time.

13. The method according to claim 11, further comprising operating the trigger circuit in a first or a second operating mode as a function of the first and/or the second control signal, wherein the trigger signal is output:
   in the first operating mode as a function of the falling edge of the last pulse in the first control signal and the adjustable delay time, and
   in the second operating mode (B) as a function of the second control signal.

14. The method according to claim 10, further comprising generating an edge of the trigger signal by means of an edge of the second control signal and triggering the current-source current as a function of the edge of the trigger signal and an adjustable delay time (Td').

15. The method according to claim 10, further comprising providing the first control signal as a serial data signal and the second control signal as a serial clock signal of an I2C bus and reading a binary encoded programming value and setting the programming signal as a function of the programming value.

16. The method according to claim 15, further comprising outputting the trigger signal to the current source as a function of the second control signal, while the first control signal has a value HIGH.

17. A circuit arrangement for driving an electrical load, comprising,
   a first terminal for feeding a first control signal;
   a second terminal for feeding a second control signal;
   a first output, to which an electrical load can be coupled;
   a current source, which is coupled to the first output; and
   a control device, which is coupled to the first and the second terminal, comprising:
      a programming circuit, which is coupled on the output side to a first control input of the current source, and
      a trigger circuit, which is coupled on the input side to the first and the second terminal and on the output side to a second control input of the current source,
   wherein the trigger circuit comprises a flip-flop and an AND gate for generating the trigger signal.

18. The circuit arrangement according to claim 17, wherein the programming circuit for the output of a programming signal to the first control input of the current source is adapted for setting a current value of a current-source current and the trigger circuit is adapted for the output of a trigger signal to the second control input of the current source for triggering an output of the current-source current to the electrical load.

19. The circuit arrangement according to claim 17, wherein the control device is adapted for operating the trigger circuit in one of two operating modes as a function of the first and/or the second control signal.

* * * * *